(12) United States Patent
Witlicki et al.

(10) Patent No.: US 10,337,355 B2
(45) Date of Patent: Jul. 2, 2019

(54) ALIGNMENT OF A BEARING COMPARTMENT AND AN ENGINE CASE

(71) Applicant: United Technologies Corporation, Hartford, CT (US)

(72) Inventors: Russell B. Witlicki, Wethersfield, CT (US); Daniel Rosen, Meriden, CT (US); Alexander Rothchild, Stratham, NH (US); Armando Amador, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 475 days.

(21) Appl. No.: 15/004,605

(22) Filed: Jan. 22, 2016

(65) Prior Publication Data

US 2017/0211423 A1    Jul. 27, 2017

(51) Int. Cl.
| | | |
|---|---|---|
| *F01D 25/28* | (2006.01) | |
| *B23P 19/04* | (2006.01) | |
| *B23P 19/10* | (2006.01) | |
| *F01D 25/16* | (2006.01) | |
| *F01D 25/24* | (2006.01) | |
| *G05B 15/02* | (2006.01) | |

(Continued)

(52) U.S. Cl.
CPC .......... *F01D 25/285* (2013.01); *B23P 19/042* (2013.01); *B23P 19/10* (2013.01); *F01D 25/04* (2013.01); *F01D 25/162* (2013.01); *F01D 25/24* (2013.01); *G05B 15/02* (2013.01); *G05D 17/02* (2013.01); *F05D 2220/32* (2013.01); *F05D 2230/64* (2013.01); *F05D 2260/15* (2013.01); *F05D 2260/96* (2013.01)

(58) Field of Classification Search
CPC ...... F01D 25/285; F01D 25/04; F01D 25/162; F01D 25/24; F01D 25/28; B23P 19/042; B23P 19/10; G05B 15/02; G05D 17/02; F05D 2220/32; F05D 2230/64; F05D 2260/15; F05D 2260/96
USPC .......................................... 700/275; 415/126
See application file for complete search history.

(56) References Cited

U.S. PATENT DOCUMENTS

| | | |
|---|---|---|
| 2,650,050 A | 8/1953 | Chandler |
| 3,876,309 A | 4/1975 | Zicaro |

(Continued)

OTHER PUBLICATIONS

EP search report for EP17152611.4 dated Jun. 6, 2017.

(Continued)

*Primary Examiner* — Dzung Tran
(74) *Attorney, Agent, or Firm* — O'Shea Getz P.C.

(57) ABSTRACT

Aspects of the disclosure are directed to a first device coupled to a bearing compartment structure, a second device coupled to an engine case structure, and a controller. The controller is configured to: issue a command to one of the first device or the second device to generate a signal, obtain data from the other of the one of the first device or the second device, where the data is based on the signal, process the data to determine that a skew exists between the bearing compartment structure and the engine case structure in an amount that is greater than a threshold, identify at least one torqueing device to activate based on processing the data, and cause the at least one torqueing device to activate to cause the bearing compartment structure and the engine case structure to align within the threshold amount.

5 Claims, 7 Drawing Sheets

(51) Int. Cl.
*G05D 17/02* (2006.01)
*F01D 25/04* (2006.01)

(56) References Cited

U.S. PATENT DOCUMENTS

| | | | |
|---|---|---|---|
| 4,854,703 A | 8/1989 | Ammann | |
| 8,864,121 B2 | 10/2014 | Zhang | |
| 2005/0008043 A1* | 1/2005 | Kousek | F16M 11/14 372/15 |
| 2006/0093465 A1* | 5/2006 | Moniz | F01D 25/162 415/68 |
| 2008/0297808 A1* | 12/2008 | Riza | G01B 9/02004 356/503 |
| 2010/0296912 A1 | 11/2010 | McCallum et al. | |
| 2011/0194933 A1* | 8/2011 | Klusman | F01D 25/16 415/229 |
| 2011/0277569 A1* | 11/2011 | Rush | H02G 3/088 73/866.5 |
| 2015/0192034 A1 | 7/2015 | Bedard | |
| 2015/0192165 A1 | 7/2015 | Bauer | |
| 2015/0345337 A1 | 12/2015 | Petty et al. | |
| 2016/0017754 A1 | 1/2016 | Kumar | |

OTHER PUBLICATIONS

Design World Staff, "Measuring Distance with Laser Sensor Technology", available from: <http://www.bannerengineering.com/en-US/ljyhs>, Feb. 9, 2012.

Ismat M. Elhassan, "Comparative Study of Accuracy in Distance Measurement Using: Optical and Digital Leves", King Saud University, Journal of King Saud University—Engineering Sciences (2011), pp. 15-19, available online Dec. 10, 2010.

K.R. Sreejith, "Indirect Length Measurement Between Two Points on a Remote Plane", International Journal of Applied Information Systems—ISSN : 2249-0868, vol. 2—No. 5, pp. 24-30, Feb. 2012.

* cited by examiner

ALIGNMENT OF A BEARING COMPARTMENT AND AN ENGINE CASE

BACKGROUND

In connection with modern aircraft, a gas turbine engine generally includes a compressor section to pressurize an airflow, a combustor section to burn a hydrocarbon fuel in the presence of the pressurized air, and a turbine section to extract energy from the resultant combustion gases.

Bearings and an associated bearing compartment may be used to support the engine. A static structure associated with the bearing compartment is typically aligned/centered relative to a case structure of the engine. Providing for such aligning/centering allows for optimal clearance between rotating blades and rub strips. This clearance ultimately translates into performance/efficiency of the engine.

Threaded rods (also referred to as "I-rods" in the art) are used to radially position the bearing compartment structure relative to the engine case structure. A first end of the rods are attached to the bearing compartment structure and a second end of the rods are attached to the engine case structure. By adjusting the rods the bearing compartment can be radially shifted. Adjustments are obtained by pre-loading the rods on the second end (e.g., the end of the rods attached to the engine case structure) with one or more threaded nuts.

Referring to FIG. 2, a flowchart of a method 200 used for aligning/centering the bearing compartment structure relative to the engine case structure is shown.

In block 206, the bearing compartment is mounted onto the engine case structure.

In block 212, the threaded rods are pre-loaded.

In block 218, a frame (e.g., a main turbine frame) is attached to a mounting plate and centered on a turntable or rotary measurement device.

In block 224, a plurality of dial indicators/gauges are wired to one or more data acquisition machines from the bearing compartment and the engine case. The dial indicators/gauges are used to understand/interpret the centers of the bearing compartment and the engine case.

In block 230, the data acquisition machine provides data/information regarding the results of the centering based on the dial indicators/gauges. The data/information frequently takes the form of a plot and indicates which rod(s) to adjust (e.g., which nuts to turn).

In block 236, a determination is made whether the bearing compartment structure is aligned/centered to the engine case structure within a threshold/tolerance. If so (e.g., the "yes" path is taken out of block 236), flow proceeds to block 242 and the method 200 ends. Otherwise (e.g., the "no" path is taken out of block 236), flow proceeds to block 248.

In block 248, a technician adjusts the bearing compartment using one or more tools (e.g., a wrench). The adjustment of block 248 is based on the output provided in block 230 (e.g., an identification of which rod(s) to adjust). From block 248, flow may proceed to block 230; in this respect, a loop may be established between blocks 230, 236, and 248 until the centering/alignment is within tolerance.

The method 200 takes considerable time (e.g., two to three hours) to perform, frequently requires more than one technician, and is difficult to set-up. The results of the method 200 are not necessarily repeatable and rely on the judgment and experience of the technician.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a method for aligning a bearing compartment structure relative to an engine case structure, the method comprising: issuing, by a controller that includes a processor, a command to a first device to generate a signal, obtaining, by the controller, data from a second device that is based on the signal, processing, by the controller, the data to determine that a skew exists between the bearing compartment structure and the engine case structure in an amount that is greater than a threshold, identifying, by the controller, at least one torqueing device to activate based on said processing, and causing, by the controller, the at least one torqueing device to activate to cause the bearing compartment structure and the engine case structure to align within the threshold amount. In some embodiments, the first device is coupled to the bearing compartment structure and the second device is coupled to the engine case structure. In some embodiments, the first device includes at least one of a physical probe, a laser, or an optical transmitter. In some embodiments, the first device includes a laser, and the second device includes a laser detector. In some embodiments, the at least one torqueing device includes at least one of an electronic motor or a servomotor. In some embodiments, the method comprises identifying, by the controller, an amount of torque to apply to a nut coupled to the at least one torqueing device, and causing, by the controller, the at least one torqueing device to apply torque to the nut in accordance with the identified amount. In some embodiments, the method comprises identifying, by the controller, a time duration to activate the at least one torqueing device, causing, by the controller, the at least one torqueing device to activate in accordance with the time duration, and causing, by the controller, the at least one torqueing device to deactivate at an end of the time duration.

Aspects of the disclosure are directed to a system for aligning a bearing compartment structure relative to an engine case structure, the system comprising: a first device coupled to the bearing compartment structure, a second device coupled to the engine case structure, and a controller configured to: issue a command to one of the first device or the second device to generate a signal, obtain data from the other of the one of the first device or the second device, where the data is based on the signal, process the data to determine that a skew exists between the bearing compartment structure and the engine case structure in an amount that is greater than a threshold, identify at least one torqueing device to activate based on processing the data, and cause the at least one torqueing device to activate to cause the bearing compartment structure and the engine case structure to align within the threshold amount. In some embodiments, the system comprises the at least one torqueing device. In some embodiments, the system comprises a threaded rod that couples the bearing compartment structure and the engine case structure. In some embodiments, the system comprises a nut coupled to the rod and the at least one torqueing device. In some embodiments, the at least one torqueing device is configured to apply torque to the nut when the at least one torqueing device is activated. In some embodiments, a first end of the rod is coupled to the bearing compartment structure and a second end of the rod is coupled to the engine case structure. In some embodiments, the at least one torqueing device includes at least one of an electronic motor or a servomotor. In some embodiments, the controller is configured to issue the command to the first device and obtain the data from the second device. In some embodiments, the first device includes at least one of a physical probe, a laser, or an optical transmitter. In some embodiments, the first device includes a laser, and the second device includes a laser detector. In some embodiments, the controller is configured to provide an alert when the controller determines that the bearing compartment structure and the engine case structure align within the threshold amount. In some embodiments, the at least one torqueing device includes a plurality of torqueing devices, and the system comprises a plurality of threaded rods that couple the bearing compartment structure and the engine case structure, and a plurality of nuts, where each one of the nuts is coupled to a respective one of the rods, and where each one of the torqueing devices is coupled to a respective one of the nuts.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
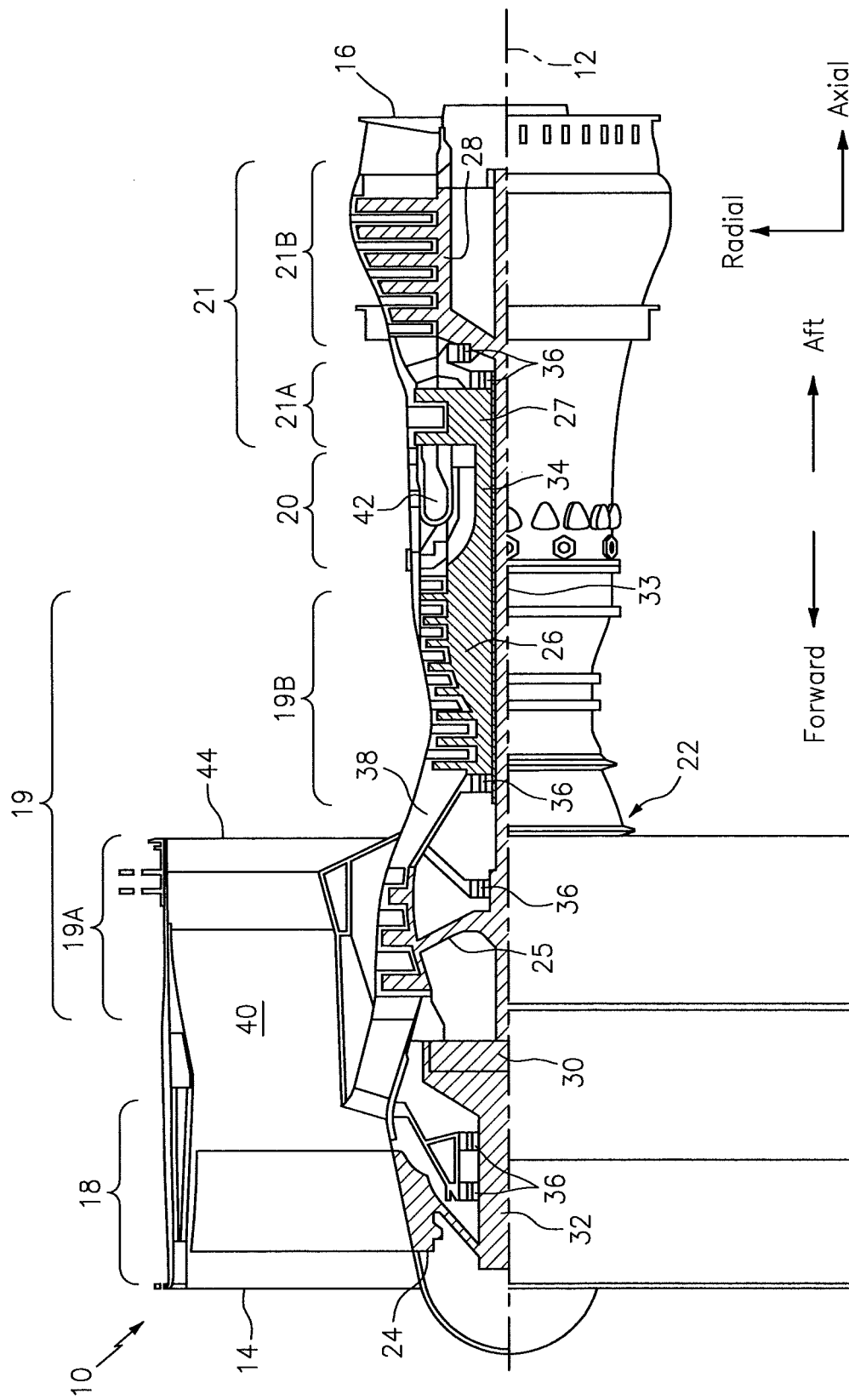
FIG. 1 is a side cutaway illustration of a geared turbine engine.
Figure 2:
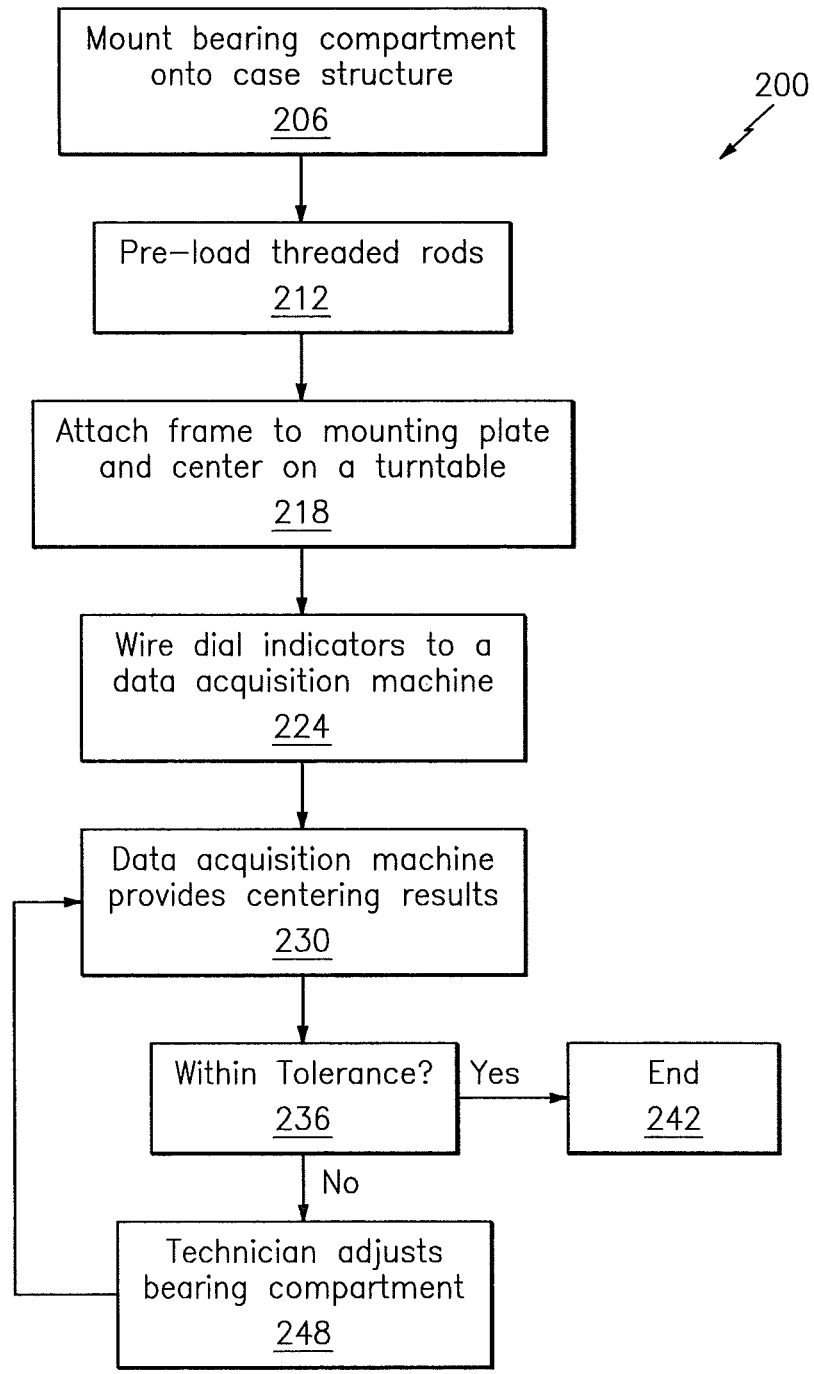
FIG. 2 illustrates a flowchart of a method used for aligning/centering a bearing compartment structure relative to an engine case structure in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for centering/aligning a bearing compartment structure relative to an engine case structure. In some embodiments, a system framework incorporating feedback is provided to obtain such an alignment. The system framework may include a computer or controller that may be configured to acquire data from one or more sensors and issue one or more commands to cause the bearing compartment structure to align with the engine case structure within a threshold amount.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 3:
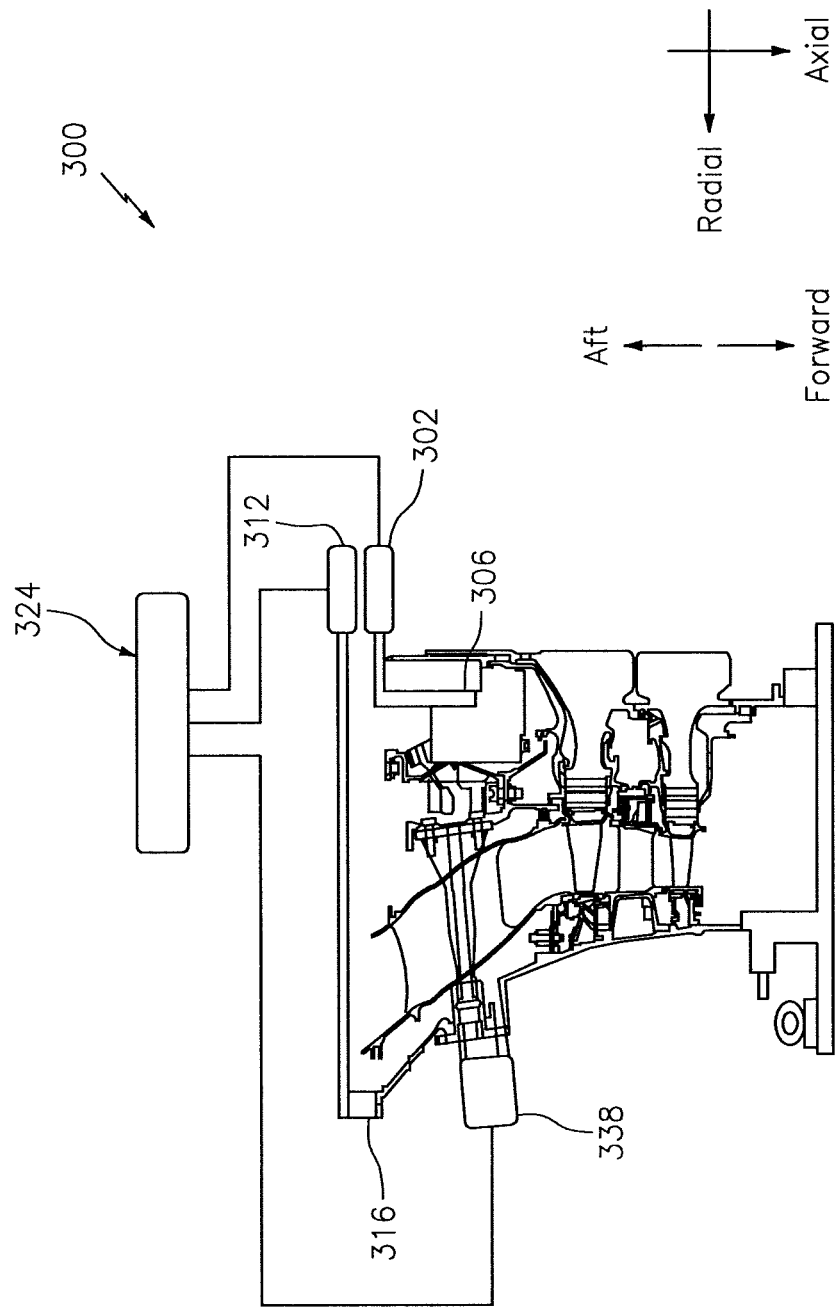
FIG. 3 illustrates a system for aligning/centering a bearing compartment structure relative to an engine case structure in accordance with aspects of this disclosure.

Referring now to FIG. 3, a system 300 is shown. The system 300 may be included as part of an engine, such as for example the engine 10 of FIG. 1.

The system 300 may include a first device 302 coupled to a first structure 306 and a second device 312 coupled to a second structure 316. In some embodiments, the first structure 306 may include one of a bearing compartment structure or an engine case structure and the second structure 316 may include the other of the bearing compartment structure or the engine case structure. The first device 302 may include at least one of a physical probe, a laser, an optical transmitter, or any other device that may be configured to generate one or more signals that can be quantified or analyzed. The second device 312 may include a detector/sensor that may be configured to detect the signal(s) generated by the first device 302. In this respect, the signal(s) generated/provided by the device 302 may serve to stimulate/excite the device 312.

The device 302 and the device 312 may be coupled to a computer/controller 324. The controller 324 may include any combination of software, hardware (e.g., one or more processors, memory, etc.), and/or firmware to execute one or more algorithms or functions, such as those described below.

Figure 4:
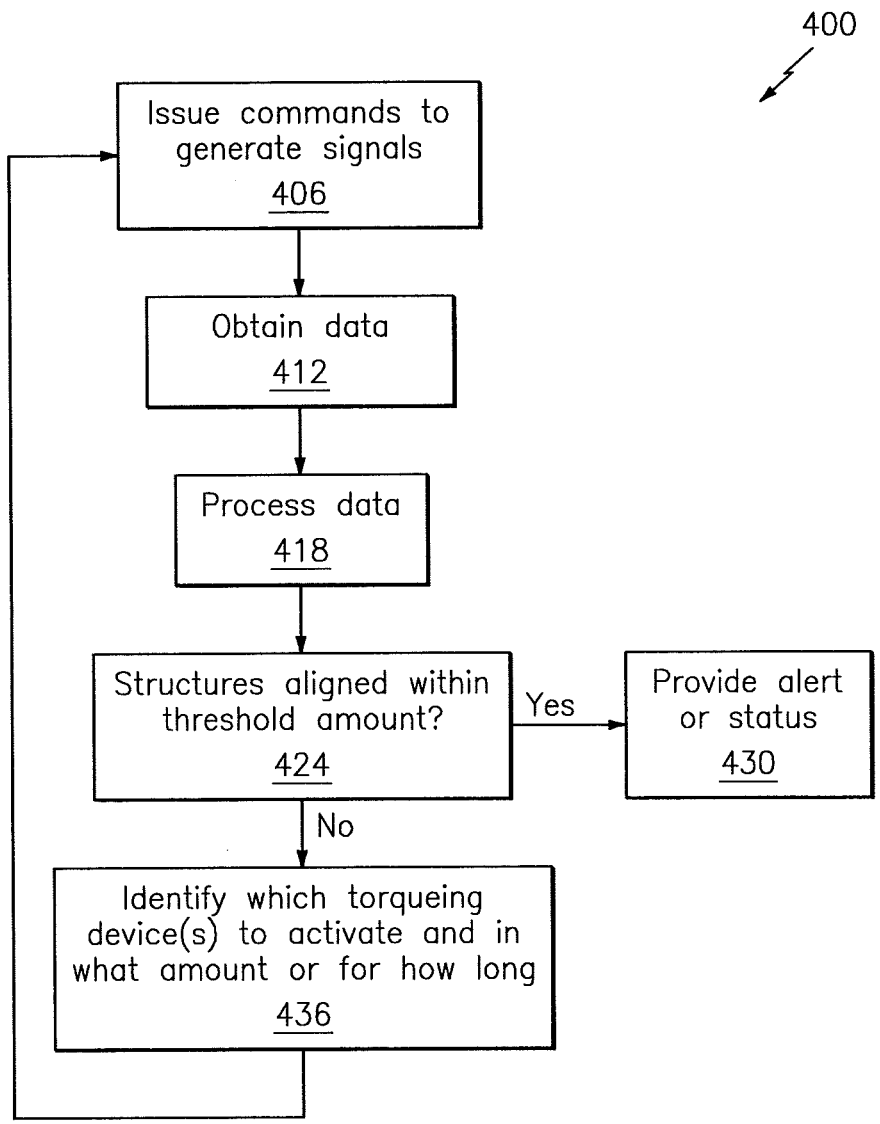
FIG. 4 illustrates a flowchart of a method used for aligning/centering a bearing compartment structure relative to an engine case structure in accordance with aspects of this disclosure.

For example, and referring to the flowchart of the method 400 in FIG. 4, in block 406 the controller 324 may issue commands to the device 302 to cause the device to generate one or more signals.

In block 412, the controller 324 may obtain data from the device 312. The receipt of the data in block 412 may be coordinated/synchronized with the commands issued in block 406. The data of block 412 may be indicative of an alignment of the structure 306 relative to the structure 316.

In block 418, the controller 324 may process the data of block 412. The processing of the data in block 418 may include a determination of an alignment of the structure 306 relative to the structure 316. For example, the processing of block 418 may be based on a proximity and/or intensity of the signal(s) emitted by the device 302 in relation to a target point/location on the device 312.

Figure 3A:
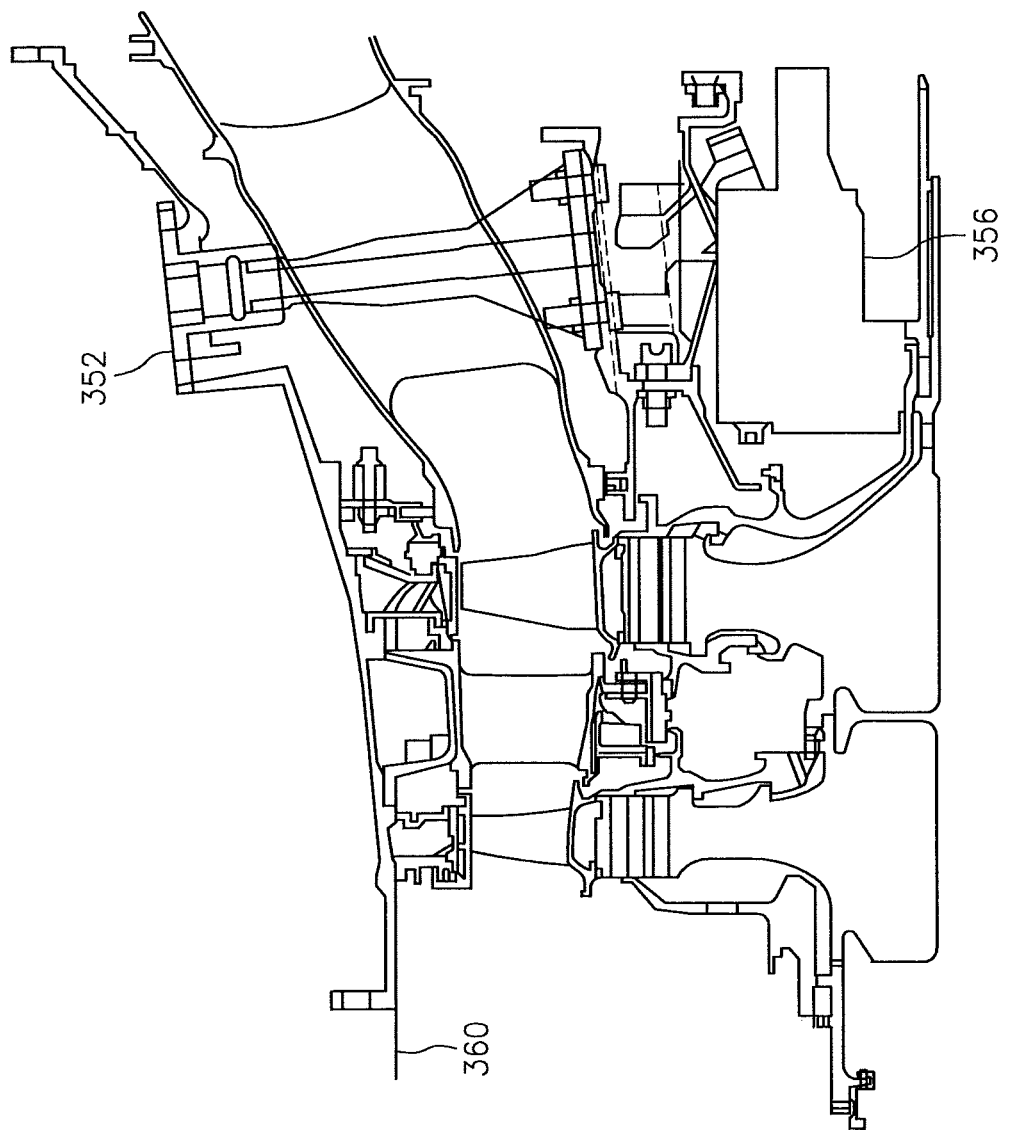
FIG. 3A illustrates a cross-section of an engine and an alignment of surfaces of the engine in accordance with aspects of this disclosure.

In block 424, based on the processing of the data in block 418 the controller 324 may determine whether the structure 306 is sufficiently aligned with the structure 316, such that any skew that may exist between the structure 306 and the structure 316 is less than a threshold amount. As an example, and referring to FIG. 3A, one or more nuts 352 may be torqued until an axial point of a surface 356 is concentric to a surface 360 within approximately 0.003 inches (approximately 76.2 micrometers). If such alignment is obtained (e.g., the "yes" path is taken out of block 424), flow may proceed from block 424 to block 430. Otherwise (e.g., the "no" path is taken out of block 424), flow may proceed from block 424 to block 436.

In block 430, an alert may be provided that the method 400 has completed. The alert may include an auditory alert, a graphical alert (e.g., a displayed message), etc. In some embodiments, the alert of block 430 may include an indication of any skew (or any potential range of skew) that may exist in the alignment of the structures 306 and 316. In some embodiments, a report/status of any gaps or misalignment that may have existed during the execution of the method 400 may be provided as part of block 430.

In block 436, the controller 324 may identify one or more nuts to turn/torque by way of activating/enabling one or more torqueing devices 338. Such an identification may be based on one or more gaps or misalignment between the structures 306 and 316 as determined by the operations in blocks 418 and 424. A torqueing device 338 may include one or more electronic motors, servomotors, or the like. As part of block 436, the controller 324 may also identify an amount of torque to apply to each such nut, or analogously, the controller 324 may determine a time duration that the torqueing device 338 should be activated/enabled. The identifications or determinations provided in block 436 may attempt to align the structures 306 and 316 in as short a time frame as possible while not imposing undue strain/stress (e.g., strain/stress in an amount that is greater than a threshold) on any of the components of the system 300.

From block 436 flow may proceed to block 406. In this manner, a loop may be established between blocks 406, 412, 418, 424, and 436 until the structure 306 is sufficiently aligned with the structure 316.

Figure 5:
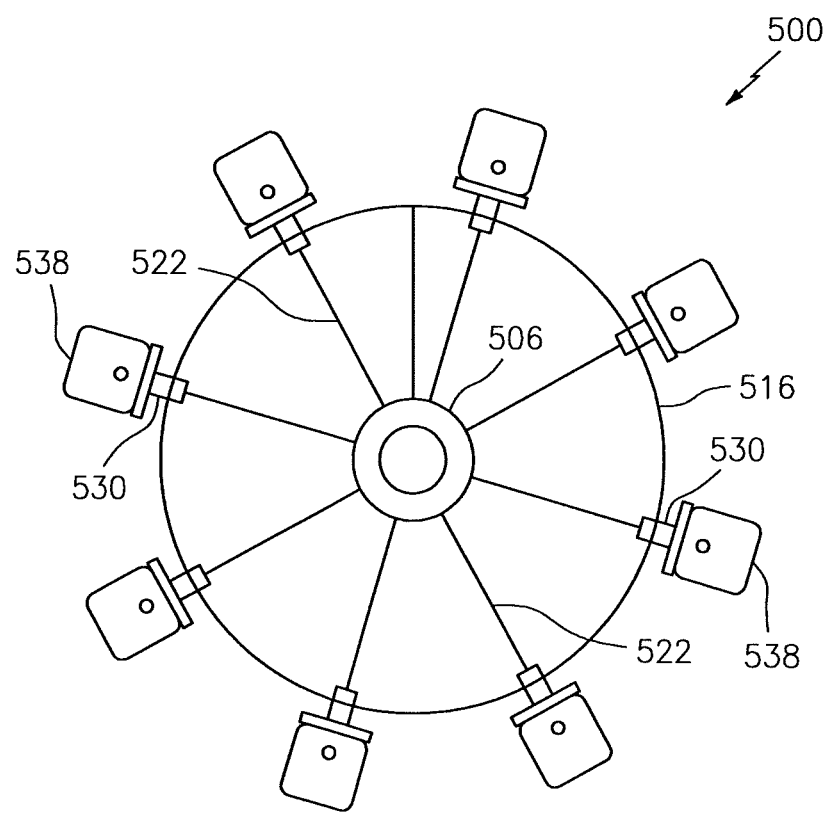
FIG. 5 illustrates a hub-and-spoke style of arrangement of a bearing component structure and an engine case structure in accordance with aspects of this disclosure.

Referring to FIG. 5, a system 500 incorporating a first structure 506 (which may correspond to the structure 306) and a second structure 516 (which may correspond to the structure 316) is shown. The first structure 506 and the second structure 516 may be coupled to one another via one or more rods 522, forming a hub-and-spoke style of arrangement. Each of the rods 522 is shown as being coupled to a nut 530. Each of the nuts 530 may be selectively turned/torqued via a respective torqueing device 538 (which may correspond to a torqueing device 338).

Figure 6:
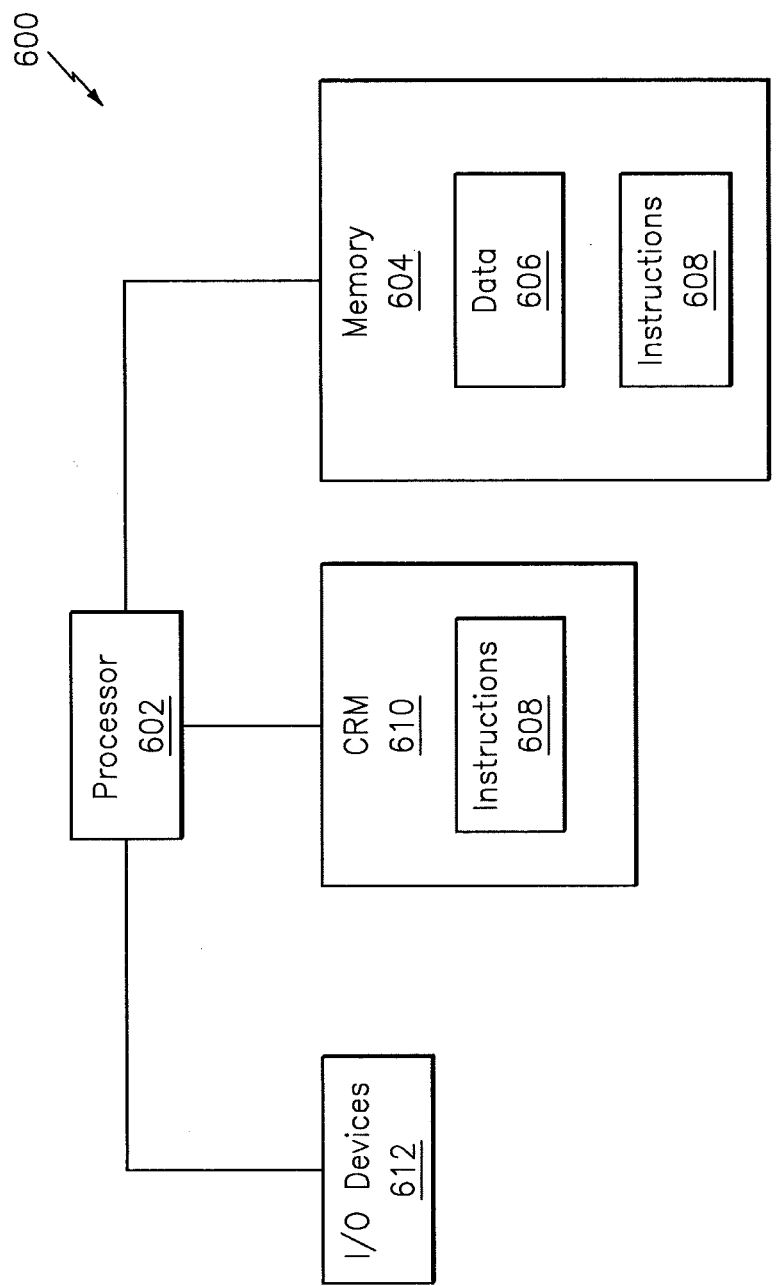
FIG. 6 illustrates a computing system in accordance with aspects of this disclosure.

Referring now to FIG. 6, an illustrative system 600 is shown. The system 600 may be associated with one or more computers and/or one or more controllers (e.g., the controller 324). The system 600 includes one or more processors (generally shown by a processor 602) and a memory 604. The memory 604 may store data 606 and/or instructions 608. The system 600 may include a computer-readable medium (CRM) 610 that may store some or all of the instructions 608. The CRM 610 may include a transitory and/or a non-transitory computer-readable medium.

The instructions 608, when executed by the processor 602, may cause the system 600 (or one or more portions thereof) to perform one or more methodological acts or processes, such as those described herein.

The data 606 may include data obtained from one or more detectors, may include results of processing the data obtained from the detectors, etc. In some embodiments, the data 606 may be associated with one or more programs, such as a modeling or simulation program. For example, the data may be native to or supported by one or more computed aided design or computer aided drawing programs, either one or both of which may be referred to as CAD programs. The data 606 may be used in connection with aligning one or more structures as described herein.

The system 600 may include one or more input/output (I/O) devices 612 that may be used to provide an interface between the system 600 and one or more additional systems or components. The I/O devices 612 may include one or more of a graphical user interface (GUI), a display screen, a touchscreen, a keyboard, a mouse, a joystick, a pushbutton, a microphone, a speaker, a transceiver, a sensor, etc.

Technical effects and benefits of this disclosure include enhanced confidence in the assembly of an engine. For example, aspects of the disclosure may eliminate/minimize technician error by automating an alignment/centering procedure, thereby obtaining more consistent and reliable results. Increased productivity/realization may be obtained, as a technician is merely tasked with set-up and tear-down/breakdown activities.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system for aligning a bearing compartment structure relative to an engine case structure, the system comprising:

an optical transmitter that is coupled to the bearing compartment structure and transmits an optical transmit signal in response to a command signal;
an optical detector that is coupled to the engine case structure, detects the optical transmit signal and provides a detected signal indicative of position of the bearing compartment structure with respect to the engine case structure;
a controller that issues the command signal, receives the detected signal indicative of the position of the bearing compartment structure with respect to the engine case structure, and processes the detected signal to determine if a coaxial skew exists between the bearing compartment and the engine case structure, and issues at least one of a plurality of torque application command signals to position the bearing compartment and the engine case structure in coaxial alignment; and
a plurality of controllable rods, extending radially between the bearing compartment and the engine case structure, that each receives an associated one of the plurality of torque application signals.

2. The system of claim 1, wherein each of the controllable rods includes an associated drive unit that applies torque to a nut that transfers torque to the associated control rod in response to the associated at least one of the plurality of torque application command signals.

3. The system of claim 1, wherein a first end of each of the plurality of controllable rods is coupled to the bearing compartment structure and a second end of each of the plurality of controllable rods is coupled to the engine case structure.

4. The system of claim 3, wherein each of the plurality of controllable rods comprises an associated at least one of an electronic motor or a servomotor that applies a torque onto the associated one of the plurality of controllable rods in response to the associated at least one of the plurality of torque application command signals.

5. The system of claim 1, wherein the controller provides an alert signal when the controller determines that the bearing compartment structure and the engine case structure are in coaxial alignment.

* * * * *